(12) United States Patent
Battle et al.

(10) Patent No.: US 8,560,944 B2
(45) Date of Patent: Oct. 15, 2013

(54) DOCUMENT MODELING USING CONCURRENT HIERARCHICAL STATE MACHINES

(75) Inventors: Steven Battle, Bristol (GB); Helen Balinsky, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 825 days.

(21) Appl. No.: 12/753,894

(22) Filed: Apr. 4, 2010

(65) Prior Publication Data

US 2011/0246539 A1  Oct. 6, 2011

(51) Int. Cl.
 *G06F 17/00* (2006.01)
(52) U.S. Cl.
 USPC .......................... 715/255; 715/200; 715/234
(58) Field of Classification Search
 None
 See application file for complete search history.

(56) References Cited

U.S. PATENT DOCUMENTS

2010/0146478 A1* 6/2010 Head et al. ................... 717/101

OTHER PUBLICATIONS

Oliveira, M.C.F; Turine, M.A.S.; Masiero, P.C.; "A statechart-based model for hypermedia applications," ACM Trans. Inf. Syst. 19, 1 (Jan. 2001), pp. 28-52.*
Harel, D.; Gery, E.; "Executable object modeling with statecharts," Computer, vol. 30, No. 7, pp. 31-42 (Jul. 1997). Franca Garzotto, Paolo Paolini, and Daniel Schwabe. 1993. HDM\-a model-based approach to hypertext application design. ACM Trans. Inf. Syst. 11, 1 (Jan. 1993), 1-26.*
Franca Garzotto, Paolo Paolini, and Daniel Schwabe. 1993. HDM\-a model-based approach to hypertext application design. ACM Trans. Inf. Syst. 11, 1 (Jan. 1993), 1-26.*
Jin-Cheon Na and Richard Furuta. 2001. Dynamic documents: authoring, browsing, and analysis using a high-level petri net-based hypermedia system. In Proceedings of the 2001 ACM Symposium on Document engineering (DocEng '01). ACM, New York, NY, USA, 38-47.*
P. David Stotts and Richard Furuta. 1989. Petri-net-based hypertext: document structure with browsing semantics. ACM Trans. Inf. Syst. 7, 1 (Jan. 1989), 3-29.*
Yi Zheng and Man-Chi Pong. 1993. Using statecharts to model hypertext. In Proceedings of the ACM conference on Hypertext (ECHT '92), D. Lucarella, J. Nanard, M. Nanard, and P. Paolini (Eds.). ACM, New York, NY, USA, 242-250.*
Wikipedia, "UML State Machine", 16 pages, available at Wikipedia. com, retrieved on Feb. 6, 2013.*
Steve Battle and Helen Balinsky. 2009. Modelling composite document behaviour with concurrent hierarchical state machines. In Proceedings of the 9th ACM symposium on Document engineering (DocEng '09). ACM, New York, NY, USA, 25-28.*
"Representational State Transfer," http://en.wikipedia.org/wiki/Representational_State_Transfer, last modified Apr. 3, 2010.
F. Sommers, "Working with States in Flex 4," http://www.artima.com/articles/flex_4_states.html, Sep. 16, 2009.
R. Alur et al., "Communicating Hieararchical State Machines," in 26th Int'l Colloquium on Automata, Languages, and Prog'g, No. LNCS 1644, pp. 169-178, 1999.

(Continued)

*Primary Examiner* — Doug Hutton, Jr.
*Assistant Examiner* — Scott M Kelly (57) ABSTRACT

A document having a number of components is modeled as a concurrent hierarchical state machine derived from a number of secondary state machines. The concurrent hierarchical state machine hierarchically encompasses the secondary state machines and corresponds to the document as a whole. The secondary state machines are concurrent to one another. Each secondary state machine corresponds to one of the components of the document.

14 Claims, 5 Drawing Sheets

(56) References Cited

OTHER PUBLICATIONS

J.M. Boyer, "Interactive Office Documents: A New Face for Web 2.0 Applications," in Procs. of the 8th ACM Symp. on Doc. Eng'g, pp. 8-17, 2008.

Oebps container format (ocf), version 1.0, International Digital Publishing Forum, http://wwvv.idpf.org/ocf/ocf1.0/download/ocf10.htm, Sep. 2006.

Open packaging format (opf), version 2.0, International Digital Publishing Forum, http://www.openebook.org/2007/opf/OPF_2.0_final_spec.html, 2007.

Business process modeling notation (bpmn), version 1.2, http://www.omg.org/spec/BPMN/1.2, Jan. 2009.

D. Harel, "Statecharts: A Visual Formalism for Complex Systems," Science of Computer Prog'g, 8:231-274, 1987.

* cited by examiner

DOCUMENT MODELING USING CONCURRENT HIERARCHICAL STATE MACHINES

BACKGROUND

A document is considered a collection of related data that may be stored in a digital file in a particular format on a computer-readable storage device. Examples of basic and straightforward documents, for instance, include word processing documents that are generated by word processing computer programs, presentation documents that are generated by presentation computer programs, and so on. Documents are conventionally considered to be the passive subjects of workflows. A workflow defines a series of steps or processes that can be and that are to be performed on a document, sometimes in a particular order.

DETAILED DESCRIPTION

As noted in the background section, a document is conventionally considered to be the passive subject of a workflow. However, the conception of what a document is and entails has become increasingly complex. As such, it has become more difficult for a centralized workflow to cater to the variety of processes that may be performed against the document and its constituent components.

For instance, a given document may have a number of components. For example, an electronic book, or e-book, may have different components that are generated in different ways. Some components may be human generated in a conventional manner, such as by using a word processing computer program. Other components may be generated by automatically retrieving content from an electronically accessible location.

Examples of these latter types of components include really simple syndication (RSS) feeds, which are subscribed to typically over the Internet. An RSS feed is a summary of content available on a web site that is published in the RSS format. While a person may generate the content for an RSS feed, such as in the form of a blog, the corresponding component of an e-book automatically retrieves this content without human interaction. In any case, the components of a document like an e-book can operate independently of one another. It is therefore said that these components are concurrent to one another.

Embodiments of the present disclosure provide for a way by which a document having such disparate and mixed components—and which may themselves include additional sub-components, and so on, in a recursive manner—can be modeled. Specifically, embodiments of the disclosure permit the processes that are to be performed against the document and its components, sub-components, and so on, to be defined within the model itself. Therefore, rather than having a centralized workflow that is operative on a passive document, the model of a document defines the processes that can be performed on the document and its various constituent parts.

A document itself is modeled in embodiments of the present disclosure by what is referred to herein as a concurrent hierarchical state machine, which is derived from and hierarchically encompasses a number of secondary state machines that correspond to the components of the document. The state machines may be stored inline with the document components, or they may be stored externally to the document, such that the document components store references to their corresponding state machines. The state machines describe the way in which the document changes over time.

A concurrent hierarchical state machine is hierarchical in that the hierarchy of the document to its constituent parts, like components and sub-components, is preserved within the model. A concurrent hierarchical state machine is concurrent in that the secondary state machines are concurrent to one another, since the components can be independent of one another and the processes by which changes are made to the components can be performed independently of each other. Performance of these processes thus result in the composition of the document as a whole. Therefore, instead of a single state machine describing how the document changes as a whole, each component of the document that may change independently has its own state machine. The state machine of the document as a whole is derived from the state machines of its individual components.

Modeling a document component as a state machine means the following. First, the valid states of the document component, as can be verified, are described. Each state in the state machine corresponds to a set of valid document component instances, such that each valid instance corresponds to a unique state. Second, valid transitions between these states, representing corresponding changes in the document component, are described. The transitions from one state to a different state imply a change in the underlying instance of the document component.

A concurrent hierarchical state machine that models a given document composed of a number of document components extends the conception of a finite state machine to include secondary state machines that are concurrent to one another and that are hierarchically subordinate to the concurrent hierarchical state machine. A finite state machine may be generally defined as a model of behavior composed of a finite number of states, as well as transitions between these states, and actions that are performed when exiting and/or entering the states. In this respect, a finite state machine is similar to a flow graph, which can be inspected to determine the manner by which an internal logic proceeds when various conditions are satisfied.

The actions and transitions of the states of the secondary state machines that correspond to the components of the document define the behaviors of these states. These behaviors in turn are considered as extensions to the behavior of the concurrent hierarchical state machine as a whole. That is, the behavior of the concurrent hierarchical state machine representing the document as a whole is reflective of the actions and transitions of the states of the secondary state machines that correspond to the components of the document. The states of the secondary state machines are therefore considered substates of the concurrent hierarchical state machine.

More specifically, the transitions among the states of the secondary state machines that correspond to the components correspond to the processes by which changes are effectuated within the document. The concurrent hierarchical state machine is thus used to effectuate changes within the document. That is, the transitions among the states of the secondary state machines—and therefore of concurrent hierarchical state machine itself—are followed to effectuate changes within the document.

Modeling a document having a number of components as a concurrent hierarchical state machine derived from and encompassing a number of secondary state machines corresponding to the components of the document provides for certain advantages. Specifically, by integrating the definitions of the processes by which changes can be made to the components of the document within the corresponding part of the document itself, a separate and centralized workflow does not have to be invoked to realize the changes to the document. That is, the overall document process is segmented into parts, where a workflow part is delegated to a corresponding document part, and stored within and enacted with this corresponding document part. As such, the complexities involved with maintaining such a separate and centralized workflow are avoided. Rather, the concurrent hierarchical state machine provides for an object-oriented programming (OOP)-type approach to modeling a document, in which both the data and the definitions of the processes that can operate on the data are integrated within the same model.

Figure 1:
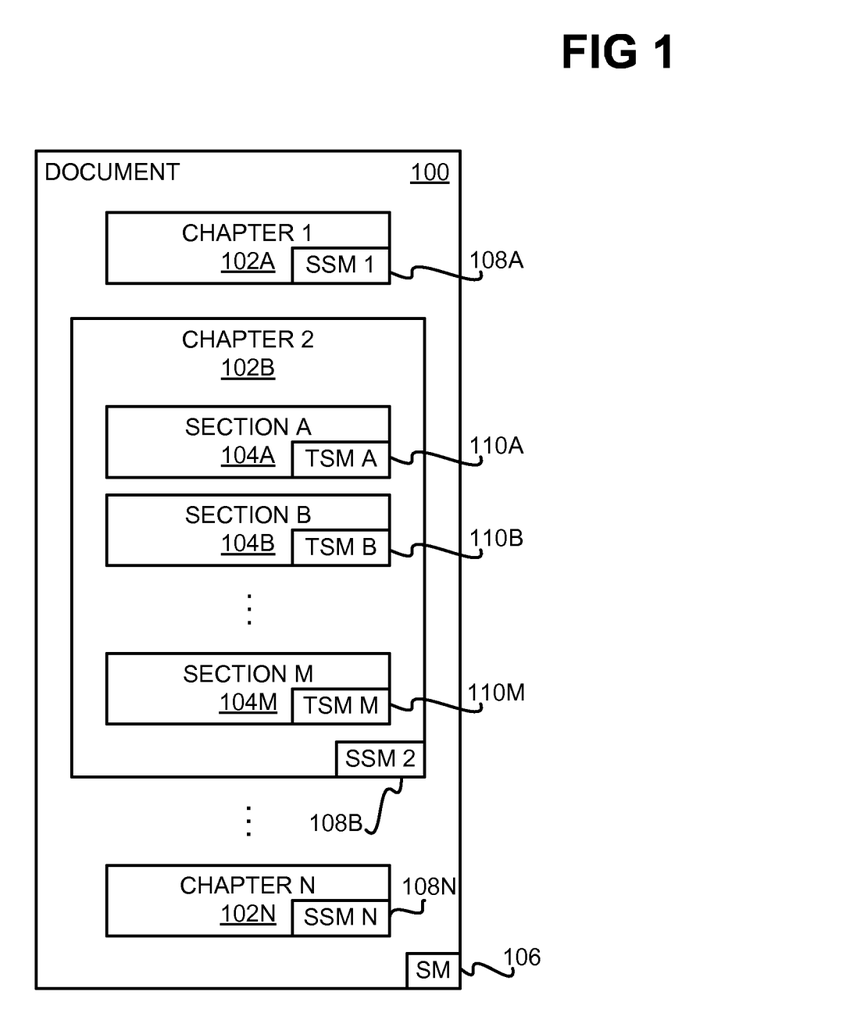
FIG. 1 is a diagram of an example document and its corresponding state machines, according to an embodiment of the present disclosure.

FIG. 1 shows an example composite document 100 that can be modeled by a concurrent hierarchical state machine, according to an embodiment of the disclosure. The document 100 includes a number of chapters 102A, 102B, . . . , 102N, collectively referred to as the chapters 102. The chapters 102 may also be referred to as the components of the document 100. Subsequent and parallel modifications of the document 100 made in accordance with a workflow of the document 100 can be modeled by a concurrent hierarchical state machine.

Each component of the document 100 may itself include sub-components. For example, in FIG. 1, the chapter 102B includes sections 104A, 104B, . . . , 104M, collectively referred to as the sections 104. The sections 104 may thus also be referred to as the sub-components of the document 100.

Each sub-component of the document 100 may itself include sub-sub-components, which is not specifically depicted in FIG. 1, each sub-sub-component may include sub-sub-sub components, and so on. That is, any given part of the document 100 may itself include a number of parts, in a recursive manner. A part of the document 100 is thus one of a component of the document 100, a sub-component of the document 100, a sub-sub-component of the document 100, and so on.

The chapters 102 of the document 100 are independent of and can be processed independently of one another. For example, the chapter 102A may quote a wiki entry that is updated by periodically retrieving a new version of the wiki entry from a particular location defined by a networking address, such as in relation to the Internet. A wiki is a web site that can be quickly edited by its visitors with simple formatting rules. Similarly, the chapter 102B may be an RSS feed that is updated by periodically retrieving a new version of the RSS feed from a particular location defined by a networking address, such as in relation to the Internet. By comparison, the chapter 102N may be text that is updated manually by a person using a word processing document.

Also depicted in FIG. 1 are state machines corresponding to the document 100, the chapters 102, and the sections 104. The state machine 106 corresponds to the document 100 as a whole. The secondary state machines 108A, 108B, . . . , 108N, collectively referred to as the secondary state machines 108, correspond to the chapters 102 of the document 100. Finally, the tertiary state machines 110A, 110B, . . . , 110M, collectively referred to as the tertiary state machines, correspond to the sections 104 of the chapter 102.

Figure 2:
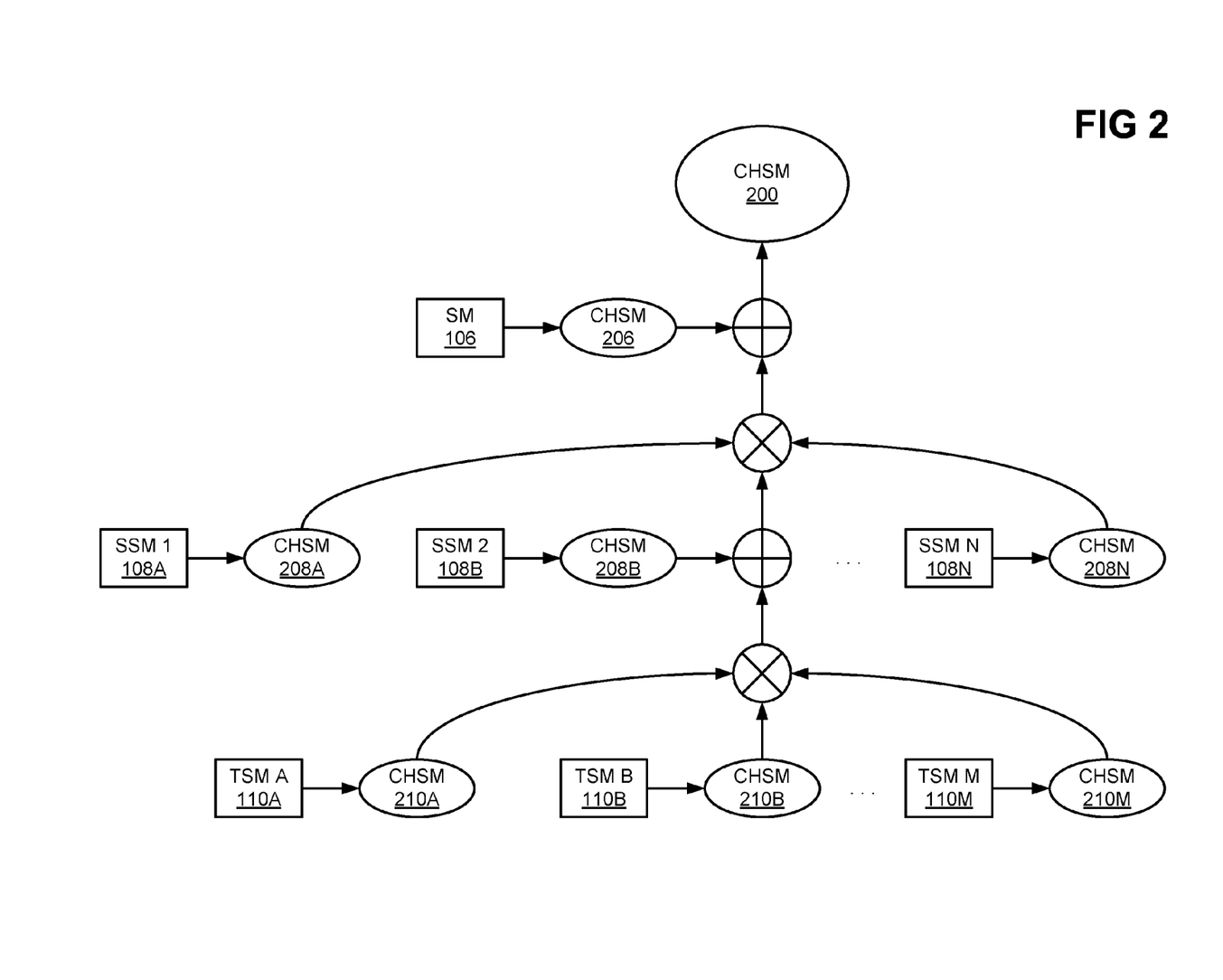
FIG. 2 is a diagram of a representative concurrent hierarchical state machine that models the example document of FIG. 1, according to an embodiment of the present disclosure.

FIG. 2 shows how the state machines 106, 108, and 110 are interrelated to one another to represent the document 100, the chapters 102, and the sections 104, according to an embodiment of the disclosure. There are two operators depicted in FIG. 2. The circled plus sign $\oplus$ represents the hierarchical operator, and the circled multiplication sign $\otimes$ represents the concurrency operator. Each operator receives one or more concurrent hierarchical state machines as input, and generates a concurrent hierarchical state machine as output.

Without loss of generality, in the example of FIG. 2, the state machines 106, 108, and 110 are finite state machines, depicted as rectangles, and therefore are translated to corresponding concurrent hierarchical state machines 206, 208, and 210, which are depicted as ovals in FIG. 2, prior to input to the operators. It is noted, however, that reference to a given state machine herein, where such reference is made to a finite state machine, presumes the translation of the finite state machine to a corresponding hierarchical state machine prior to input to an operator. To this extent, where reference is made to the state machines 106, 108, and/or 110, such reference implies that the state machines 106, 108, and/or 110 are translated to corresponding hierarchical state machines 206, 208, and/or 210, respectively, as appropriate. It is noted that the state machines 208 include the state machines 208A, 208B, . . . , 208N, and that the state machines 210 include the state machines 210A, 210B, . . . , 210M.

The concurrent hierarchical state machine 200 represents the document 100 as a whole, and hierarchically includes the state machine 106 representing the structure of the document 100 (as translated first to the concurrent hierarchical state machine 206), and the secondary state machines 108 (as translated first to the concurrent hierarchical state machines 208). The concurrency operator being applied to the concurrent hierarchical state machines 208 denotes that within the concurrent hierarchical state machine 200, the secondary state machines 108 are concurrent to one another. Furthermore, the hierarchical operator being applied to the concurrent hierarchical state machine 206 in relation to the concurrent hierarchical state machines 208 denotes that within the concurrent hierarchical state machine 200, the (concurrent) secondary state machines 108 are hierarchically subsidiary to the state machine 106.

Similarly, the hierarchical operator is applied to the concurrent hierarchical state machine 208B in relation to the concurrent hierarchical state machines 210, and the concurrency operator is applied to the concurrent hierarchical state machines 210. The concurrent operator being applied to the concurrent hierarchical state machines 210 denotes that within the concurrent hierarchical state machine 200, the tertiary state machines 110 (as translated to the concurrent hierarchical state machines 210) are concurrent to one another. The hierarchical operator being applied to the concurrent hierarchical state machine 208B in relation to the concurrent hierarchical state machines 210 denotes that within the concurrent hierarchical state machine 200, the (concurrent) tertiary state machines 110 are hierarchically subsidiary to the state machine 108B.

The concurrent hierarchical state machine 200 thus can be considered as hierarchically encompassing and being derived from the secondary state machines 106 corresponding to the chapters 102 of the document 100. Because the chapter 102B includes a number of sections 104, the secondary state machine 202B can likewise be considered as hierarchically encompassing and being derived from the tertiary state machines 110 corresponding to the sections 104 of the chapter 102B. Each tertiary state machine 110 may itself be derived from and encompass quaternary state machines, which is not specifically in depicted in FIG. 2, and each quaternary state machine may include quinary state machines, and so on. That is, any given state machine from which the concurrent hierarchical state machine 200 may itself be derived from a number of state machines, in a recursive manner. The levels of such state machines—i.e., secondary state machines, tertiary state machines, quaternary state machines, and so on—correspond to the parts of the document 100, such as components, sub-components, sub-sub-components, and so on.

The hierarchical composition of the concurrent hierarchical state machine 200 via the secondary state machines 106 (and the latter via the tertiary state machines 110 in the case of the secondary state machine 108B) eliminates transitions that are duplicated across states of the state machine 200 that are duplicated across states that can be grouped together. That is, a child state machine, nested within a parent state machine, represents a more specific set of states than the parent state machine. If every child state machine duplicates the same reflexive transition, then the transition can be moved into the parent state machine, where the transition appears just once. Events that are not handled by a state of a given state machine can be handled by the parent state machine to the given state machine. In this way, states of the secondary state machine 108 can be considered as the substates of the concurrent hierarchical state machine 200 as a whole.

The concurrent hierarchical state machine 200 hierarchically encompasses the secondary state machines 108 in that the states of the concurrent hierarchical state machine encompass the secondary state machines 108. As new document components are added, or as existing document components are deleted (assuming that such deletion is a valid state change), the concurrent hierarchical state machine 200 is regenerated from the current document structure and the associated secondary state machines 108. In this way, the concurrent hierarchical state machine 200 reflects and is synchronized with the current document structure.

Furthermore, information may be passed between the state machines of different levels via changes to the document 100 itself, and to its child documents 102. For example, if two state machines are composed based on the same feed, updates to the components to which these two state machines correspond do not occur independently. Rather, the parent state machine—such as the concurrent hierarchical state machine 200 where the children state machines are secondary state machines 108—requests and aggregates the feed, which may be accessed by both child state machines. For this to be effective, a common feed is located in a well known place, relative to the children, without the children having to have full knowledge of the structure of the parent. Similarly, the action of moving a child document into its initial state may be initiated as an edit to the child document. This edit may be performed by the parent document, without the parent document having full knowledge of the structure of the child document.

In this respect, the concurrent hierarchical state machine 200 communicates with the secondary state machines 108 (and vice-versa) via a schema, or interface. The schema is the manner by which a document exposes a state that is transmitted between documents, such as from the concurrent hierarchical state machine 200 to each secondary state machine 108. The schema is not computer-executable code per se, but rather is written in a markup language, such as the eXtensible Markup Language (XML).

The basic concept of a document 100 made up of components like chapters 102 and sections 104, and the basic concept of a concurrent hierarchical state machine 200 derived from and encompassing secondary state machines 108 and tertiary state machines 110, have been described. What follows next in the detailed description is a more precise and mathematically oriented presentation of a concurrent hierarchical state machine. Thereafter, an example process graph that shows the hierarchical and concurrent aspects of a concurrent hierarchical state machine in relation to its secondary state machines is described, followed by a method and a computing device according to varying embodiments of the disclosure.

It is first noted that each state machine, including each secondary state machine, corresponding to a component of the document is considered a classical finite state machine defined by a tuple $(\Sigma, S, s_0, s_n, \delta)$. In this tuple, $\Sigma$ is an alphabet of valid changes that can be performed on the component to which the secondary state machine corresponds, and S is a set of states of the component to which the secondary state machine corresponds. Furthermore, $s_0$ is an initial state of the component to which the state machine corresponds, and $s_n$ is a single final state of the component to which the state machine corresponds. The notation $\delta = S \rightarrow S$ denotes a state transition function among the states of the component to which the state machine corresponds.

In expressing a concurrent hierarchical state machine, it is desirable to avoid the large number of states that results from taking a product over the state spaces of multiple composed secondary state machines. Concurrent composition means that the state transitions in concurrent components may be arbitrarily interleaved in relation to one another in their performance. Therefore, the independence of the composed secondary state machines is maintained by forming an orthogonal product expression, in which a state is not a single $s_i \in S$, but rather is a configuration $K \subseteq S$ of currently active, but orthogonal, states. In this respect, the secondary state machines may be considered concurrent to one another in that their states are orthogonal to one another as well.

Furthermore, the domain and range of the state transition function are described as configurations, specifically as power sets over S, or $\wp(S)$. In other words, this is a function from one set of states to another set of states. The domain of this function represents the current configuration (i.e., set of states), and the range represents the subsequent configuration. A concurrent hierarchical state machine is deemed to have terminated when the current configuration is equal to the final configuration. The final configuration can be denoted as F.

A concurrent hierarchical state machine corresponding to a document as whole is defined by a tuple $(\Sigma, S, I, F, \delta)$. In this tuple, $\Sigma$ is an alphabet of valid changes that can be performed on the document, and S is a set of states of the document. Furthermore, $I \subseteq S$ and is an initial configuration of the document, whereas $F \subseteq S$ and is a set of final states of the document. Finally, $\delta = \wp(S) \rightarrow \wp(S)$ and is a state transition function among configurations of S, where $\wp(S)$ is the power set of S, as noted above. It is noted that a classical finite state machine can be treated as a simple case of a concurrent hierarchical state machine that has no concurrency or hierarchy.

The initial and final configurations, I and F, respectively, are the singleton set formed by $s_0$ and $s_n$. As such, $$CHSM(\Sigma, S, I, F, \delta) = CHSM(\Sigma, S, \{s_0\}, \{s_n\}, \{\{\alpha\} \to \{\beta\}: \alpha \to \beta \epsilon \delta\})$$

That is, the initial configuration/is the (orthogonal) set of the initial states $\{s_0\}$ of all the secondary state machines, and the final configuration F is the (orthogonal) set of the final states $\{s_n\}$ of all the secondary state machines.

The state transition function $\delta$ similarly is the set of all the transitions between the states of all the secondary state machines, such that for each such transition $\alpha \to \beta$ in the secondary state machine, $\{\alpha\} \to \{\beta\}$ is a member of the set $\delta$, which is the transition function for the concurrent hierarchical state machine. In this notation, $\alpha$ and $\beta$ represent two given states in a given secondary state machine. The state transition function accounts for hierarchical relationships among the states of the concurrent hierarchical state machine. More generally, each state of the concurrent hierarchical state machine is a set of orthogonal states of the secondary state machines.

As noted above, state machines describe the way in which a document changes over time. Each component of the document that may change independently has its own state machine. The state machine of the document as a whole is derived from the state machines of the document's individual components.

As also noted above, to model a document component as a state machine, the following is described. First, the valid states of the document component, as can be verified, are described, where each state in the state machine corresponds to a set of valid document component instances, such that each valid instance of a document component corresponds to a unique state. Second, the valid transitions between these states, which represent corresponding changes to the document component, are described, where each transition from one state to a different state implies a change in the underlying instance of the document component.

It is noted that concurrency is used to capture the manner by which different components of a document can be edited independently of one another. The document documents may, in fact, be edited by different users or different processes, in different places. Concurrent state machines simplify the problem of attempting to model this conjunction of different states, and all the possible interleavings of valid state transitions. This is achieved by the concurrent state machines describing transitions between configurations, or sets, of states, rather than individual states. The individual states within a configuration, or set, overlap, and the actual state of the document as a whole is defined by this intersection.

Furthermore, if a state represents a set of valid document component instances, and transitions from the state representing valid edits to these document components, then a given subset of the state represents a smaller, specialized set of valid document components with which the additional transitions (corresponding to the edits), may be associated. These states are arranged hierarchically. This hierarchy within the hierarchical tree structure is identified, and a document component is consider as being specialized by the addition of sub-components corresponding to such specialized sub-behaviors, where the additional edits make these additions possible.

The orthogonal product expression of a set of secondary state machines (which are for sake of generality assumed to themselves be concurrent hierarchical state machines) is formed by taking the union of their non-overlapping alphabets, state spaces, initial and final configurations, and transition functions. That is, $$\otimes_i (\Sigma_i, S_i, F_i, \delta_i) = (\cup_i \Sigma_i, \cup_i S_i, \cup_i F_i, \cup_i \delta_i).$$

In this expression, $\otimes$ is the orthogonal product operator.

The hierarchical expression of a concurrent hierarchical state machine is created by modifying the state transition function to account for hierarchical relationships among the states. For example, if the range of the state transition function includes a state $\kappa$ that has a sub-process having an initial state $\alpha$, then the range is extended to include $\alpha$. On entry to the super-state in question, all the initial substates are activated. Similarly, if the domain of the state transition function includes a state $\lambda$, and this state has a sub-process within a final state $\omega$, then the super-process in question has to wait for all the sub-processes to terminate. It is assumed that the initial and final states may themselves not be extended.

The hierarchical composition of a pair of concurrent hierarchical state machines (which may be secondary state machines corresponding to two components of a document) is expressed as a binary operator with the parent to the left and the child to the right. This operator uses an additional mappings $\epsilon = S \to S$, which defines state-substate extensions for the composition, mapping parent states to child states (i.e., mapping states of the concurrent hierarchical state machine to states of one or more of the secondary state machines). As such, $$(\Sigma, S, I, F, \delta) \oplus_\varepsilon (\Sigma', S', I', F', \delta') = \begin{pmatrix} \Sigma \cup \Sigma', S \cup S', I \cup I', F \cup F', \\ \{\Delta(\alpha, F') \to \Delta(\beta, I') : (\alpha \to \beta) \in \delta\} \cup \delta' \end{pmatrix}$$

In this expression, $\Delta$ is a transition function, $\Delta(A,X) = A \cup \{x : x \epsilon \epsilon(A) \wedge x \in X\}$, where the parameter A is a configuration representing the source or target of a transition, the parameter X is the set of initial or final states, and x is a local variable that has scope over values of X. The first concurrent hierarchical state machine is represented by $(\Sigma, S, I, F, \delta)$, and the second concurrent hierarchical state machine is represented by $(\Sigma', S', I', F', \delta')$. The operator $\oplus_\epsilon$ is the hierarchical composition operator. Finally, in $\{\Delta(\alpha, F'') \to \Delta(\beta, I') : (\alpha \to \beta) \epsilon \delta\} \cup \delta'$, $\alpha$ and $\beta$ represent two given states in the state machines.

To better explain the preceding mathematically oriented formalism of a concurrent hierarchical state machine, a specific example is now presented, in which a concurrent hierarchical state machine corresponding to a document is derived from and encompasses a first secondary state machine and a second secondary state machine. The document has two components. Therefore, the first secondary state machine corresponds to the first component of the document, and the second secondary state machine corresponds to the second component of the document.

Figure 3:
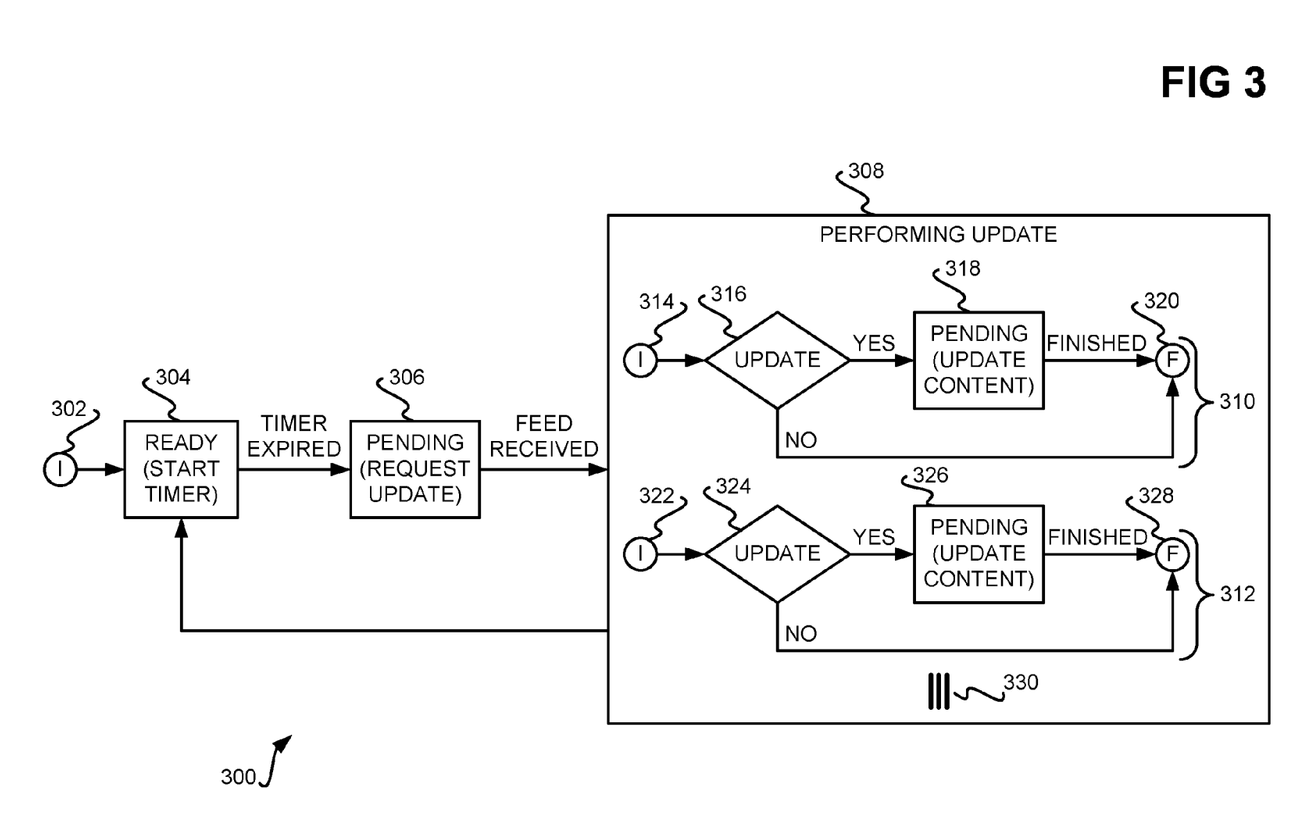
FIG. 3 is a diagram of another representative concurrent hierarchical state machine, according to an embodiment of the present disclosure.

FIG. 3 shows such a concurrent hierarchical state machine 300, according to an embodiment of the disclosure. The concurrent hierarchical state machine 300 corresponds to a document, and includes states 302, 304, 306, and 308, where the state 302 is the initial state, and where there is no final state because of the loop back to the state 304 from the state 308. The state 308 encompasses and is derived from a first secondary state machine 310 corresponding to a first component of the document and a second secondary state machine 312 corresponding to a second component of the document.

The first secondary state machine 310 includes states 314, 316, 318, and 320. The state 314 is the initial state of the first secondary state machine 310, and the state 320 is the final state of the secondary state machine 310. The second secondary state machine 312 includes states 322, 324, 326, and 328. The state 322 is the initial state of the second secondary state machine 312, and the state 328 is the final state of the secondary state machine 312.

As to the concurrent hierarchical state machine 300, there is no action that corresponds to the initial state 302. Rather, the initial state 302 immediately transitions to the state 304, which is a ready state. The action corresponding to the ready state 304 is the triggering of a timer. When the timer expires, the ready state 304 transitions to a pending state 306. The action corresponding to the pending state 306 is sending a request for a feed by which the components to which the secondary state machines 310 and 312 correspond are updated.

The pending state 306 transitions to the state 308 when the feed is received. The state 308 is a "performing update," in which the action that is performed is the updating of either or both of the secondary state machines 310 and 312. Triple vertical bars 330 indicate that the secondary state machines 310 and 312 are performed concurrently. That is, the secondary state machines 310 and 312 concurrently compose the state 308 of the concurrent hierarchical state machine 300. The fact that the state 308 encompasses the secondary state machines 310 and 312 demonstrates the hierarchical nature of the concurrent hierarchical state machine 300.

When transitioning from the pending state 306 to the state 308, the concurrent hierarchical state machine 300 passes the feed that has been received to both of the secondary state machines 310 and 312. This information is communicated from the concurrent hierarchical state machine 310 to the secondary state machines 310 and 312 via a schema, which may be formatted in accordance with a markup language like XML. In this respect, it is noted the duplication of requesting the feed is avoided. Rather than each of the secondary state machines 310 and 312 requesting the feed, the concurrent hierarchical state machine 310 requests the feed on behalf of the secondary state machines 310 and 312.

As to the first secondary state machine 310, there is no action that corresponds to the initial state 314. Rather, the initial state 314 immediately transitions to the state 316, which is a decision state. The action corresponding to the decision state 316 is determining whether or not, based on the feed that has been received from the concurrent hierarchical state machine 300, the document component to which the secondary state machine 310 corresponds has to be updated. If not, then the decision state 316 transitions directly to the final state 320.

However, if the document component to which the first secondary state machine 310 corresponds does have to be updated, the decision state 316 transitions to the pending state 318. The action corresponding to the pending state 318 is the updating of the document component to which the secondary state machine 310 corresponds. The pending state 318 transitions to the final state 320 when the update has been completed.

Similarly, as to the second secondary state machine 312, there is no action that corresponds to the initial state 322. Rather, the initial state 322 immediately transitions to the state 324, which is a decision state. The action corresponding to the decision state 324 is determining whether or not, based on the feed that has been received from the concurrent hierarchical machine, the document component to which the secondary state machine 312 corresponds has to be updated. It is noted that the secondary state machine 312 may utilize a different part of the feed than the secondary state machine 310 does. Therefore, it is entirely possible that just one, neither, or both of the secondary state machines 310 and 312 have to be updated.

If the document component to which the secondary state machine 310 corresponds does not have to be updated, then the decision state 324 transitions directly to the final state 328. However, if this document component does have to be updated, the decision state 324 transitions to the pending state 326. The action corresponding to the pending state 326 is the updating of the document component to which the secondary state machine 312 corresponds. The pending state 326 transitions to the final state 328 when the update has been completed.

Referring back to the concurrent hierarchical state machine 300 as a whole, the state 308 transitions back to the ready state 304 when both of the secondary state machines 310 and 312 have reached their final states 320 and 328, respectively. Because the secondary state machines 310 and 312 are concurrent, as indicated by the triple vertical bars 330, the secondary state machines 310 and 312 may reach their final states 320 and 328 at different times. However, if just one of the secondary state machines 310 and 312 has reached its final state, the state 308 does not transition back to the ready state 304 until the other secondary state machine has also reached its final state.

The basic procession through the states of the concurrent hierarchical state machine 300 and the secondary state machines 310 and 312 has been described. Now, this process is described using the formalism that was presented above. The concurrent hierarchical state machine 300 can be represented as P, having three states $P_0, P_1, P_2$ corresponding to the states 304, 306, and 308, where the initial state 302 is not considered in this formal representation for convenience. The concurrent hierarchical state machine 300 is further said to have an alphabet σ, an initial configuration containing $P_0$, and a final state ϕ, or null, since there is no actual final state within the concurrent hierarchical state machine 300. Therefore, $$P = \begin{pmatrix} \Sigma = \sigma, S = \{P_0, P_1, P_2\}, I = \{P_0\}, F = \phi, \\ \delta = \{P_0 \to P_1 \to P_2 \to P_1\} \end{pmatrix}.$$

The secondary state machines 310 and 312 are represented as $C_0$ and $C_1$, respectively. Disregarding the initial state 314 and the decision state 316 for convenience, the first secondary state machine 310 has states $C_{0,0}$ and $C_{0,1}$, corresponding to the states 318 and 320, respectively. Likewise, the second secondary state machine 312 has states $C_{1,0}$ and $C_{1,1}$, corresponding to the states 326 and 328, respectively.

The composite state $P_2$ composes both $C_0$ and $C_1$. The orthogonal product expression of $C_0$ and $C_1$ is therefore as follows, and is a concurrent composition corresponding to the state $P_2$ of the concurrent hierarchical state machine P:

$$(C_0 \otimes C_1) = \begin{pmatrix} \Sigma = \sigma, S = \{C_{0,0}, C_{0,1}, C_{1,0}, C_{1,1}\}, \\ I = \{C_{0,0}, C_{1,0}\}, F = \{C_{0,1}, C_{1,1}\}, \\ \delta = \{C_{0,0} \to C_{0,1}, C_{1,0} \to C_{1,1}\} \end{pmatrix}$$

This concurrent composition can evolve from its initial configuration $\{C_{0,0}, C_{1,0}\}$ in just two ways, representing the two possible interleavings of the two transitions.

Next, the hierarchical expression of P is examined, as composed with $C_0 \otimes C_1$. Specifically, $$P \oplus_\varepsilon (C_0 \otimes C_1) = \begin{pmatrix} \Sigma = \sigma, \{P_0, P_1, P_2, C_{0,0}, C_{0,1}, C_{1,0}, C_{1,1}\}, \\ I = \{P_0\}, F = \phi, \\ \delta = \begin{cases} \{P_0\} \to \{P_1\}, \{P_1\} \to \{P_2, C_{0,0}, C_{1,0}\}, \\ \{P_2, C_{0,1}, C_{1,1}\} \to \{P_1\}, \\ \{C_{0,0} \to C_{0,1}\}, \{C_{1,0} \to C_{1,1}\} \end{cases} \end{pmatrix}$$

It is noted that the initial configuration I does not include the initial states of either of the secondary state machines 310 and 312, because the processes of the secondary state machines 310 and 312 are not initiated until the state $P_2$ is reached. It is said that the state $P_2$ is extended by the secondary state machines 310 and 312. Furthermore, the $\varepsilon$ function defines mappings from $P_2$ to $C_{i,j}$.

Note the transition $P_1 \to P_2$. The set of substates that are both the children of $P_2$ as well as initial states is $C_{i,0}$. Therefore, the transition becomes $\{P_1\} \to \{P_2, C_{0,0}, C_{1,0}\}$, initiating the processes of the secondary state machines $C_0$ and $C_1$. Similarly, consider the transition $P_2 \to P_1$. The set of substates that are both children of $P_2$ and final states is $C_{i,1}$. Therefore, the transition becomes $\{P_2, C_{0,1}, C_{1,1}\} \to \{P_1\}$. As such, the transition out of $P_2$ can occur just if both the processes of the secondary state machines $C_0$ and $C_1$ have reached their final states.

The evolution of $P \oplus_\varepsilon (C_0 \otimes C_1)$ can be traced beginning with the initial configuration $\{P_0\}$. Initially there is just one choice, corresponding to the expiration of the timer, which leads to $\{P_1\}$. The next transition is to $\{P_2, C_{0,1}, C_{1,0}\}$, which initiates the processes of the secondary state machines $C_0$ and $C_1$. The document components to which these secondary state machines correspond evolve concurrently, ultimately transitioning to $\{P_2, C_{0,1}, C_{1,1}\}$. At that time, there is again just one choice, transitioning back to $\{P_1\}$.

Figure 4:
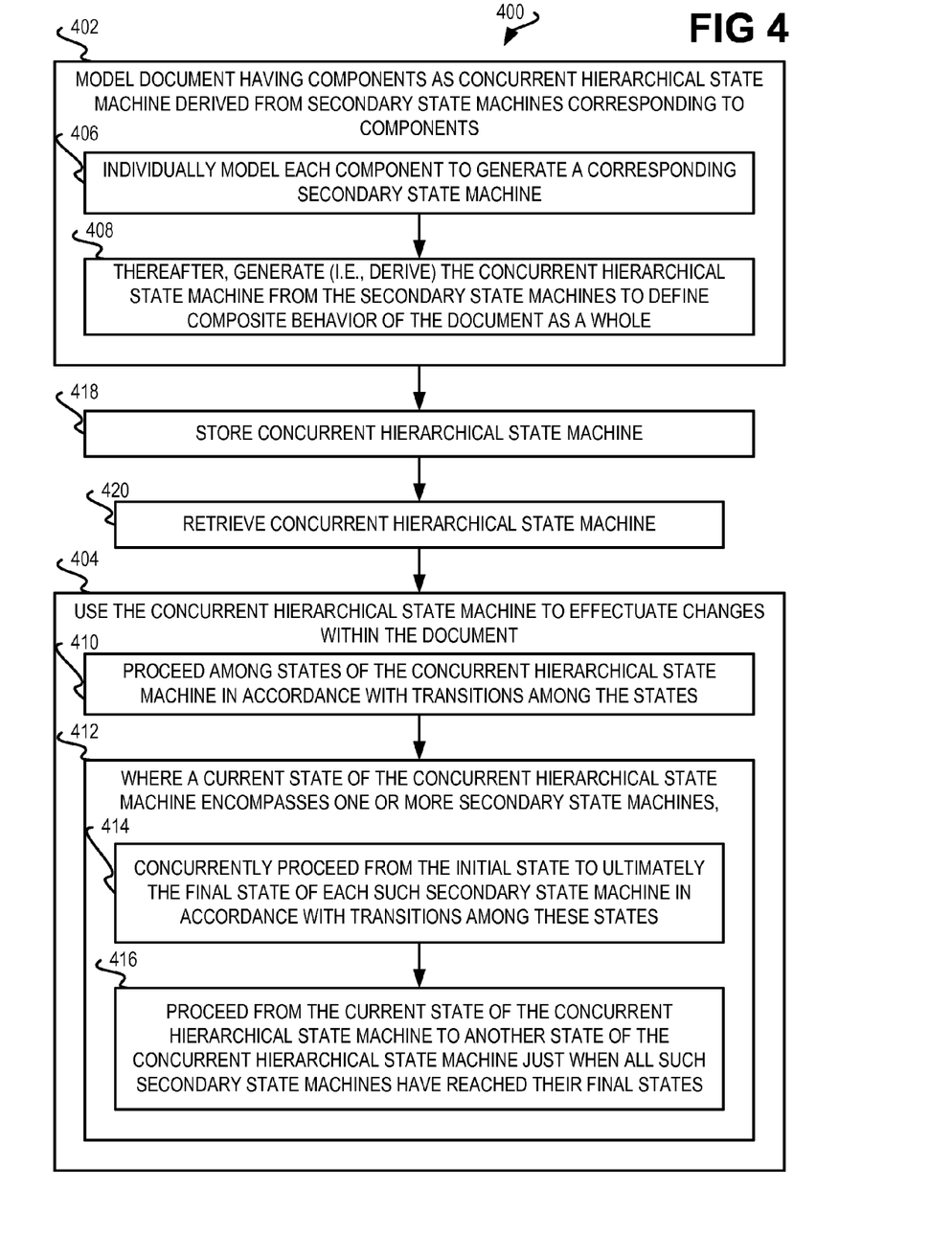
FIG. 4 is a flowchart of a method, according to an embodiment of the present disclosure.

FIG. 4 shows a method 400 that in effect summarizes the foregoing description of a concurrent hierarchical state machine, according to an embodiment of the disclosure. There are two main parts to the method 400. First, a document having a number of components is modeled as a concurrent hierarchical state machine derived from secondary state machines corresponding to the components of the document (402). Second, the concurrent hierarchal state machine that has been generated is used to effectuate changes within the document (404). Between parts 402 and 404, the concurrent hierarchical state machine may be stored on a computer-readable storage medium, or otherwise output (418), and subsequently retrieved from this medium, or otherwise input or received (420). As such, part 402 may be performed using one computing device, and part 404 may be performed using the same or another computing device.

In the first part 402, the modeling of the document is performed in a bottom-up manner, beginning with the most hierarchically minor part of the document, and proceeding upwards to the document as a whole. Therefore, for a document that has just two hierarchical levels—i.e., for a document that has components, where the components do not have any sub-components—each component is individually modeled (406), which results in the generation of a corresponding secondary state machine. Each such component is modeled as a secondary state machine using the formalism that has been described above. For example, for each component, a number of states are determined or generated, including an initial state and a final state.

Next, the concurrent hierarchical state machine is generated (i.e., derived) from the secondary state machines (408), in order to define the composite behavior of the document as a whole. The document is modeled as a concurrent hierarchical state machine using the formalism that has been described above. The states for the concurrent hierarchical state machine are determined or generated, and each secondary state machine is hierarchically positioned within one of these states. Where more than one secondary state machine is positioned within a state of the concurrent hierarchical state machine, it is said that these secondary state machines are concurrent to one another, as has been described above.

In the second part 404, the concurrent hierarchical state machine that has been constructed is used to effectuate changes within the document. As has been described in reference to the example concurrent hierarchical state machine 300 of FIG. 3, the states of the concurrent hierarchical state machine are proceeded among in accordance with the transitions of the concurrent hierarchical state machine (410). When a given state is reached that encompasses one or more secondary state machines—where this given state may be referred to as a current state—the following is performed (412).

For each such secondary state machine, there is a procession from the initial state, through any intermediary states, and ultimately to the final state (414), in accordance with the various transitions among these states. Where there is more than one such secondary state machine, the processions through the secondary state machines are concurrent to one another, as has been described above. It is noted, however, that the current state of the concurrent hierarchical state machine does not proceed to another state of the concurrent hierarchical state machine until all the secondary state machines encompasses by this current state have reached their final states (416), as has also been described above.

Figure 5:
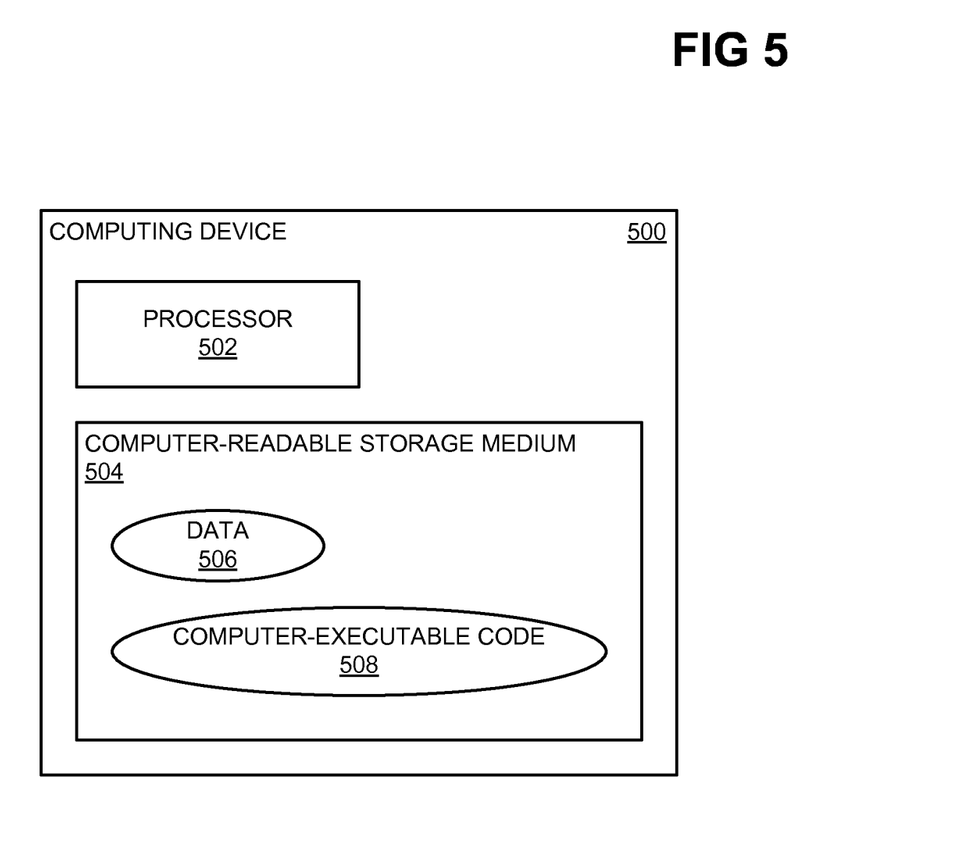
FIG. 5 is a diagram of a representative computing device, according to an embodiment of the present disclosure.

In conclusion, FIG. 5 shows a representative computing device 500, according to an embodiment of the disclosure. The computing device 500 includes a processor 502 and a computer-readable storage medium 504. The computer-readable storage medium 504 may be or include a volatile storage medium like dynamic random access memory, a non-volatile storage medium like a hard disk drive, and/or another type of storage media. Furthermore, the computing device 500 can and typically does include other components in addition to the processor 502 and the computer-readable storage medium 504, such as network adapters, and so on.

The computer-readable storage medium 504 stores data 506 and computer-executable code 508. The data 506 represents a concurrent hierarchical state machine that models a document, as has been described. The computer-executable code 508 is executed by the processor 502 to perform a method, such as the method 400 of FIG. 4 that has been described. As such, the computer-executable code 508 generates the concurrent hierarchical state machine represented by the data 506, and uses this concurrent hierarchical state machine to effectuate changes within the document, as has been described in detail above.

We claim:

1. A method comprising:
    modeling, by a processor of a computing device, a document having a plurality of components as a concurrent hierarchical state machine derived from a plurality of secondary state machines,
        where the concurrent hierarchical state machine hierarchically encompasses the secondary state machines and corresponds to the document as a whole, where the secondary state machines are concurrent to one another, and each secondary state machine corresponds to one of the components of the document; and, storing, by the processor of the computing device, the concurrent hierarchical state machine, wherein each of the secondary state machines comprises a plurality of states and a plurality of transitions among the states, the transitions corresponding to processes by which changes are effectuated to content of the corresponding one of the components of the document, the concurrent hierarchical state machine effectuating the changes by following the transitions.

2. The method of claim 1, further comprising:

retrieving the concurrent hierarchical state machine, as has been stored, by the processor of the computing device; and, using, by the processor of the computing device, the concurrent hierarchical state machine to effectuate the changes to the content of within the document.

3. The method of claim 1, wherein at least one of the secondary state machines is derived from and encompasses a plurality of tertiary state machines, each tertiary state machine corresponds to one of a plurality of sub-components of the document.

4. The method of claim 1, wherein modeling the document comprises:

individually modeling the components of the document to generate the secondary state machines; and, after the secondary state machines have been generated, generating the concurrent hierarchical state machine from the secondary state machines to define composite behavior of the document as a whole.

5. The method of claim 2, wherein using the concurrent hierarchical state machine to effectuate the changes to the content of within the document comprises:

proceeding from a first state of the concurrent hierarchical state machine to a second state of the concurrent hierarchical state machine in accordance with a first transition;

where the second state of the concurrent hierarchical state machine encompasses a given secondary state machine, proceeding from an initial state of the given secondary state machine to a final state of the given secondary state machine in accordance with one or more second transitions; and, proceeding from the second state of the concurrent hierarchical state machine to a third state of the concurrent hierarchical state machine after the given secondary state machine has reached the final state.

6. The method of claim 1, wherein the concurrent hierarchical state machine hierarchically encompasses the secondary state machines in that one or more given states of the concurrent hierarchical state machine encompass the secondary state machines.

7. The method of claim 1, wherein the secondary state machines are concurrent to one another in that transitions between states of each secondary state machine are arbitrarily interleaved and are orthogonal to one another, and wherein the concurrent hierarchical state machine communicates with each secondary state machine via a schema by which the changes to the content of the document are transmitted from the concurrent hierarchical state machine to each secondary state machine.

8. The method of claim 1, wherein the concurrent hierarchical state machine corresponding to the document as whole is defined by a tuple $(\Sigma, S, I, F, \delta)$, where $\Sigma$ is an alphabet of valid changes that can be performed on the document, S is a set of states of the document, $I \subset S$ and is an initial configuration of the document, $F \subset S$ and is a set of final states of the document, and $\delta = \mathscr{P}(S) \to \mathscr{P}(S)$ and is a state transition function among configurations of S, where $\mathscr{P}(S)$ is a power set of S, and wherein each state of the concurrent hierarchical state machine includes a set of orthogonal states of the secondary state machines.

9. The method of claim 8, wherein the state transition function accounts for hierarchical relationships among states of the concurrent hierarchical state machine.

10. The method of claim 1, wherein each secondary state machine corresponding to one of the components of the document is defined as a classical finite state machine defined by a tuple $(\Sigma, S, s_0, s_n, \delta)$, where $\Sigma$ is an alphabet of valid changes that can be performed on the component to which the secondary state machine corresponds, S is a set of states of the component to which the secondary state machine corresponds, $s_0$ is an initial state of the component to which the secondary state machine corresponds, $s_n$ is a single final state of the component to which the secondary state machine corresponds, and $\delta = S \to S$ and is a state transition function among the states of the component to which the secondary state machine corresponds.

11. The method of claim 1, wherein the secondary state machines comprise a first secondary state machine corresponding to a first component of the document, and a second secondary state machine corresponding to a second component of the document, and wherein the concurrent hierarchical state machine is a composition of an orthogonal product of the first secondary state machine and the second secondary state machine.

12. The method of claim 11, wherein the concurrent hierarchical state machine is a composition of the orthogonal product of the first secondary state machine and the second secondary state machine in that $P \oplus_\epsilon (C_0 \otimes C_1)$, where P is the concurrent hierarchical state machine, $C_0$ is the first secondary state machine, $C_1$ is the second secondary state machine, $\oplus$ is a hierarchical composition operator, $\epsilon = S \to S$ and is a function defining state-substate extensions for the composition, and $\otimes$ is an orthogonal product operator.

13. A computing device comprising:

a processor; and, a computer-readable storage medium to store data and computer-executable code, wherein the data represents a concurrent hierarchical state machine that models a document, the concurrent hierarchical state machine comprising a plurality of secondary state machines, where the concurrent hierarchical state machine hierarchically encompasses the secondary state machines and corresponds to the document as a whole, where the secondary state machines are concurrent to one another, and each secondary state machine corresponds to one of the components of the document, and wherein the computer-executable code is executed by the processor to generate the concurrent hierarchical state machine and is to use the concurrent hierarchical state machine to effectuate changes to content of the document, wherein each of the secondary state machines comprises a plurality of states and a plurality of transitions among the states, the transitions corresponding to processes by which changes are effectuated to content of the corresponding one of the components of the document, the concurrent hierarchical state machine effectuating the changes by following the transitions.

14. A non-transitory computer-readable storage medium storing computer-executable code, wherein execution of the computer-executable code by a processor of a computing device causes a method to be performed, the method comprising:

retrieving a concurrent hierarchical state machine, wherein the concurrent hierarchical state machine models a document having a plurality of components, the concurrent hierarchical state machine derived from a plurality of secondary state machines,
where the concurrent hierarchical state machine hierarchically encompasses the secondary state machines and corresponds to the document as a whole,
where the secondary state machines are concurrent to one another, and each secondary state machine corresponds to one of the components of the document; and, using the concurrent hierarchical state machine to effectuate changes to content of the document, wherein each of the secondary state machines comprises a plurality of states and a plurality of transitions among the states, the transitions corresponding to processes by which changes are effectuated to content of the corresponding one of the components of the document, the concurrent hierarchical state machine effectuating the changes by following the transitions.

* * * * *

UNITED STATES PATENT AND TRADEMARK OFFICE
CERTIFICATE OF CORRECTION

PATENT NO. : 8,560,944 B2  
APPLICATION NO. : 12/753894  
DATED : October 15, 2013  
INVENTOR(S) : Steven Battle et al.

It is certified that error appears in the above-identified patent and that said Letters Patent is hereby corrected as shown below:

In the Claims:

In column 13, line 20, in Claim 2, delete "of within" and insert -- of --, therefor.

In column 13, line 36, in Claim 5, delete "of within" and insert -- of --, therefor.

Signed and Sealed this  
Thirty-first Day of December, 2013

Margaret A. Focarino  
*Commissioner for Patents of the United States Patent and Trademark Office*